Sept. 30, 1941.   S. T. TOBY   2,257,543
VEHICLE WHEEL ATTACHMENT
Filed March 13, 1940   2 Sheets—Sheet 1
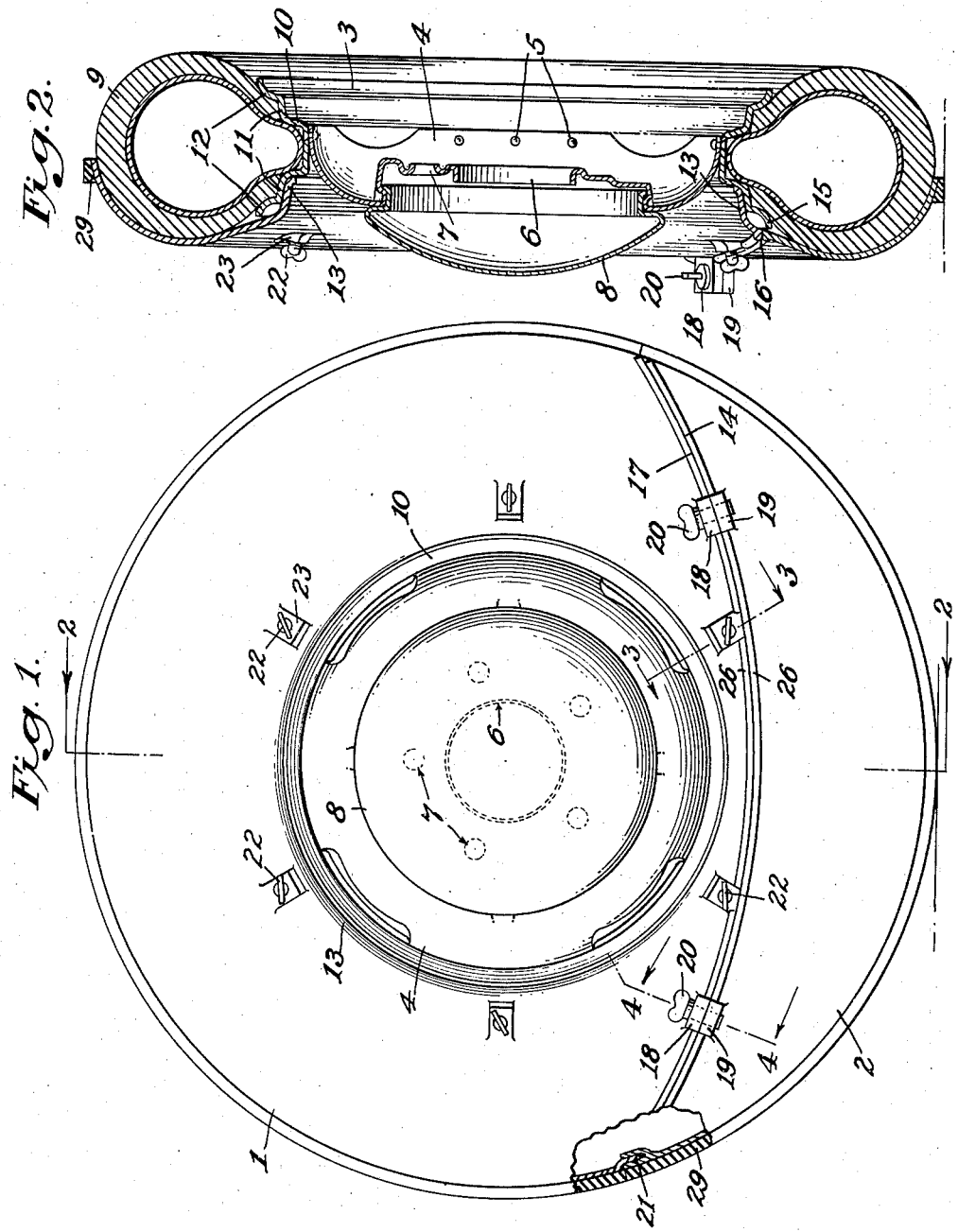
INVENTOR:
Simeon T. Toby
BY
Clarence Kerr
his ATTORNEY Sept. 30, 1941.   S. T. TOBY   2,257,543
VEHICLE WHEEL ATTACHMENT
Filed March 13, 1940   2 Sheets-Sheet 2
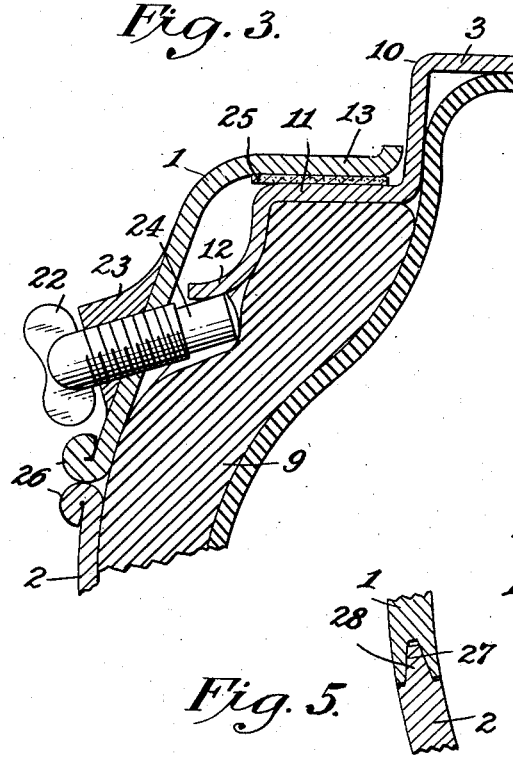
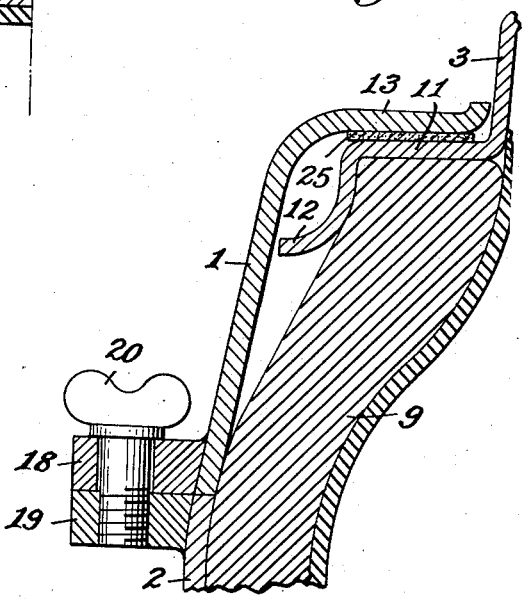
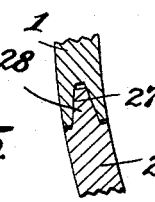
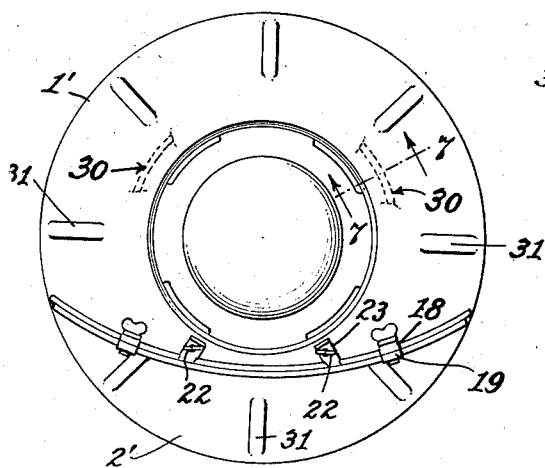
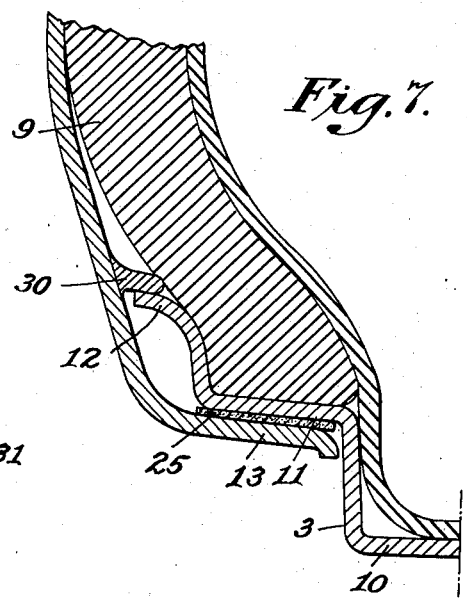
INVENTOR:
Simeon T. Toby
BY Clarence Kerr
his ATTORNEY Patented Sept. 30, 1941

2,257,543

UNITED STATES PATENT OFFICE 2,257,543

VEHICLE WHEEL ATTACHMENT

Simeon T. Toby, Elizabeth, N. J.

Application March 13, 1940, Serial No. 323,659

3 Claims. (Cl. 301—39)

The invention relates to an auxiliary wheel attachment for emergency use on pneumatic-tired vehicles. More particularly, it relates to improvements in auxiliary wheels of the type which are designed for application in a manner to serve both as a jack and a temporary tire.

Numerous attempts have been made heretofore to devise a wheel attachment for motor cars which can be applied to the wheel in the event of a blow-out or puncture of the pneumatic tire, or if the tire becomes underinflated for any reason. In some cases these attachments have been so designed as to permit their application without the use of a jack. However, none of the devices of this character which have been proposed heretofore has met with any substantial success, and they have been subject to many serious disadvantages by reason of the complicated attaching devices employed, difficulty of application to the wheel, improper load distribution, and other difficulties too numerous to mention. Accordingly, it is an object of my invention to provide an auxiliary device which serves both as a jack and as an emergency tire, permitting the vehicle to be driven away to a garage or service station without injury to the deflated tire, yet which is not subject to the disadvantages mentioned above nor to other disadvantages of the devices heretofore known.

Another object of the present invention is to provide a combined jack and emergency tire which is attachable to the rim of a motor vehicle wheel independently of the hub, spokes, and felloe. One of the objectionable features of certain types of attachments proposed in the past has been that the securing or supporting means engaged the hubs, spokes or felloes of the wheels. By reason of variations in the design of different types of wheels such attachments could be universally employed only by designing a special attachment for each wheel. In accordance with my invention, however, the attachment is applicable to all wheels of a given size, regardless of variations in the form of the hubs, spokes, and felloes, or whether the wheels are formed with spokes or solid discs. Rim designs for all wheels of a given size are quite well standardized. Accordingly, it is an object of my invention to provide an auxiliary tire and jack which supports the wheel entirely through the rim both during application and when driving away, and which also is attached to the wheel by means engaging only the rim.

A further object is to provide an auxiliary tire and jack which is simple in construction and inexpensive to produce, and which can be used as a tire cover when not in use in its auxiliary capacity.

Other objects and advantages will appear as the description proceeds.

In the drawings, which illustrate certain preferred embodiments of my invention, Figs. 1 and 2 show my improved attachment as applied to an automobile wheel, Fig. 1 being a face view and Fig. 2 a vertical transverse sectional view taken along the line 2—2 of Fig. 1.

Figs. 3 and 4 are enlarged detail sectional views taken along the lines 3—3 and 4—4 respectively of Fig. 1, illustrating the attaching means.

Fig. 5 is a detail sectional view of the end connection between the two main parts of my attachment.

Figs. 6 and 7 illustrate a modified form of the invention, Fig. 6 being a face view similar to Fig. 1 and Fig. 7 being an enlarged detail sectional view taken as indicated at 7—7 in Fig. 6.

Referring particularly to Figs. 1 and 2, it will be seen that my jack comprises two separable sections 1 and 2 which are constructed and arranged to be secured together and to the rim 3 of a vehicle wheel which may be of any conventional or suitable design. As shown, the wheel is of one of the types commonly in use today on passenger motor cars consisting of the rim 3 and a pressed disc 4 secured together in any convenient manner as by means of the rivets 5. The disc 4 is apertured at 6 to receive the hub (not shown) and is provided with a plurality of bolt holes 7 for attachment to stud bolts associated with the hub or brake drum. Inasmuch as the present invention is not concerned with the details of the wheel construction and since such constructions are well known in the art, further description of the wheel and its mounting is deemed unnecessary. The wheel may be provided with the usual hub cap 8, and one of the features of the present invention resides in the fact that my attachment can be applied as a jack and auxiliary tire without removing the hub cap as has been necessary with certain devices previously known.

The rim 3 may be of conventional form and construction for the mounting of a pneumatic tire 9, having a depressed center portion 10 forming the felloe of the wheel, this portion being of general U-shape in cross section and having outwardly extending annular flanges 11 which are tapered slightly in frustro-conical form. The ends of flanges 11 are turned outwardly and laterally to form arcuate portions 12 against which the outer walls of the casing are adapted to bear to properly hold and support the tire 9.

The sections 1 and 2 together form an annulus substantially coextensive with one side of the pneumatic tire 9, this annulus being substantially C-shaped in cross section to fit over the tire without interference with the fender of the automobile. The section 1 has an annular flange 13 which engages the inside of the rim 3, bearing snugly against the tapered section 11 of the rim. It will be observed that this annular flange 13 engages the rim of the wheel around its entire periphery and thus affords a continuous supporting engagement between the wheel and the jack formed by section 1 as well as by the auxiliary tire formed by the sections 1 and 2.

The section 1 is formed with an arcuate edge portion 14 which, where it intersects the section line 2—2 (Fig. 1) passes near the edge of the rim 3 of the wheel. This is shown clearly in Fig. 2 where it will be seen that the lower edge 15 of the rim lies opposite or slightly below the lowermost point 16 of the arcuate edge 14 of the section 1. This permits the application of the section 1 to the rim of the wheel when the tire is completely deflated, so that the side walls of the outer tire casing project laterally beyond the point 15 of the rim. The form of the arcuate edge portion 14 of the section 1 may be described as that of a flattened arc extending from a point near the annular flange 13 to the outer part of the annulus, i. e., to the points where it intersects the outer edge of the annulus.

The crescent-shaped section 2 of the annulus is formed with a complementary arcuate edge 17 for engagement with the edge 14 of the section 1. The sections 1 and 2 are provided with attaching lugs 18 and 19 respectively, preferably arranged along their arcuate meeting edges to receive clamping bolts or wing screws 20 for detachably securing the two sections together. In order to reinforce the connection between the two sections and assist in preserving the alignment between them, the outer edges thereof may be provided with a tongue and groove connection as shown at 21 in Fig. 1. The size of this connection is somewhat exaggerated as it appears in this view so as to show it up more clearly.

An important feature of the invention resides in the manner in which the annulus is attached to the wheel by means which hold it against the rim of the wheel solely by engagement with the rim. In the embodiment illustrated in Figs. 1–4 this means consists of a plurality of attaching screws 22 arranged for engagement with the outside of the rim. These screws project through the ball of the section 1 and have a threaded engagement therewith. I prefer to provide lugs 23 to reinforce the walls of the section 1 at the points of attachment and to provide a more extended bearing for the screws 22. These screws may be formed with wing heads so that the jack can be applied without the use of a wrench.

The attaching means is shown in somewhat more detail in Fig. 3 from which it will be seen that the wing screws 22 extend at an angle to the axis of the wheel in such a way as to prevent lateral movement of the annulus with respect to the rim of the wheel and thus secure it against removal. If desired, the inner ends 24 of the attaching screws may be offset and formed without threads so as to provide a smooth engagement with the flange 12 of the rim. Also, if desired, the annular flange 13 of the section 1 may be provided with a leather pad 25 or other facing material to insure a snug fit with the flange 11 of the rim and prevent defacement thereof during application and removal of the attachment. The arcuate edges 14 and 17 preferably are reenforced as by means of flanges or beaded edges 26.

The attaching means for mounting the crescent-shaped section 2 on the section 1 is shown clearly in Fig. 4 where it will be seen that the wing screw 20 passes freely through the lug 18 of the section 1 and has a threaded engagement with the lug 19 of the section 2. This provides means for drawing the two sections tightly together. It will be understood that other suitable means may be used for this purpose, however.

Fig. 5 illustrates an alternative and preferred form of engagement between the outer edges of the sections 1 and 2. This has reference to the tongue and groove connection shown at 21 in Fig. 1, but as shown in Fig. 5, this connection is made without any projections which might otherwise interfere with the tire tread during application to the wheel. The edge of one of the sections is provided with a groove or recess 27 and the other section is provided with a complementary tongue 28. The tongue and groove connection may be of tapered construction as shown in Fig. 5 for ease of alignment during application and to assist in obtaining a snug fit.

In applying my device to a wheel which has a flat tire, the section 1 is placed against the side of the rim with the flattened arcuate portion 14 at the bottom of the wheel. The wing screws 22 are then tightened, whereupon the wheel is ready to be jacked. The car is then moved or driven forwardly or backwardly for a distance sufficient to produce from about one quarter to one half turn of the wheel. During this action the wheel rolls along the arcuate edge 14 until it rests on some part of the outer edge of the annulus. Thereupon the crescent-shaped section 2 is applied over the tire and secured in place by means of the wing screws 20. It will be observed in this connection that if the vehicle is one which has very low or overhanging sides, application of the section 2 is accomplished in a simple manner by sliding the section 2 circumferentially around the wheel from a point below the overhang of the fender. The wing screws 20 having been tightened, the car is ready to be driven to a service station or garage for removal and repair of the tire. If desired, the auxiliary tire formed by the sections 1 and 2 may be provided with an edge cushion 29 of rubber or other suitable material vulcanized or otherwise attached thereto.

It will be observed from the foregoing description that the jacking of the wheel requires only two simple steps (1) the placing of the section 1 against the rim, (2) the tightening of the wing screws 22. The preparation for driving away requires but two additional simple steps (1) applying the section 2 over the tire, (2) application of the wing screws 20. Because of the fact that the attachment is secured in place by means engaging only the rim of the wheel, the device is of universal application and can be applied to many different types of wheels.

Figs. 6 and 7 illustrate a modified form of the invention in which the upper attaching screws for the section 1' are replaced by flanges 30 which engage the outside of the flange 12 of the rim. One or two of the lower attaching screws 22 are retained for the purpose of securing the section 1' in place after the flanges 30 have been hooked over the edge of the rim. In the embodiment here illustrated, I have shown the sections 1' and 2' as being provided with reinforcing beads or ribs 31 which may or may not be necessary depending upon the gauge of the metal of which the sections are made. If the sections are made of stampings, as is considered preferable, the ribs 31 can be formed at the same time that the section is being stamped out. Also, when the sections are made as metal stampings, the attaching lugs 18, 19 and 23, as well as the flanges 30, preferably are made by welding or otherwise attaching separate pieces to the main body of the stampings.

When not in use in its auxiliary capacity, my device can be used as a tire cover. For example, in the case of automobiles on which spare wheels are carried in fender wells, the attachment can be placed over the outside of the wheel before placing it in the well. In cars which carry the spare wheel in a trunk or other compartment, the attachment can be put on the wheel before it is stored away, and thus has the advantage of taking up virtually no additional space in such compartment. In station wagons where the spare wheel may be carried behind the front seat, my device provides an attractive cover and shield for the tire.

The term "outside of the rim" as used herein and in the appended claims refers to the side of the rim which is toward the tire, i. e., outside with respect to the axial center of the wheel. The term "inside of the rim" means the side which faces the axial center of the wheel.

It will, of course, be understood that the ribs 31 or other suitable reinforcing means can be applied to the form of attachment shown in Figs. 1 and 2 as well as to that shown in Figs. 6 and 7, and conversely this reinforcing means can be omitted in the latter embodiment. Other modifications will suggest themselves to those familiar with the art to which the present invention pertains. The terms and expressions which I have employed are used as terms of description and not of limitation, and I have no intention of excluding such equivalents of the invention set forth, or of portions thereof, as fall within the purview of the claims.

I claim:

1. An auxiliary tire and jack for application to the pneumatically-tired wheel of a motor vehicle comprising two separable sections which together form an annulus substantially co-extensive with one side of the pneumatic tire, one of said sections having an annular flange for engaging the rim of the wheel around its entire periphery and having an arcuate edge extending in opposite directions from a point near said annular flange to points at the outer part of the annulus.

2. An attachment for vehicle wheels which comprises two separable sections which together form an auxiliary tire, one of said sections having an annular flange arranged for engagement with the inside of the rim of a wheel and attaching screws arranged for engagement with the outside of the rim.

3. A jack comprising an annular member having a flattened arcuate portion along one side of its outer edge and an annular flange at its inner edge arranged for continuous supporting engagement with the inside of the rim of a wheel around its entire periphery.

SIMEON T. TOBY.